United States Patent
Jacobs

(10) Patent No.: US 6,389,659 B1
(45) Date of Patent: May 21, 2002

(54) GATE PANEL ATTACHMENT ASSEMBLY

(75) Inventor: John F. Jacobs, Queensbury, NY (US)

(73) Assignee: Reliable Racing Supply, Inc., Queensbury, NY (US)

( * ) Notice: Subject to any disclaimer, the term of this patent is extended or adjusted under 35 U.S.C. 154(b) by 0 days.

(21) Appl. No.: 09/640,720

(22) Filed: Aug. 18, 2000

(51) Int. Cl.$^7$ .......................... F16L 33/00; B65D 63/00
(52) U.S. Cl. ...................... 24/573.1; 24/16 PB; 116/173
(58) Field of Search ............................. 24/16 PB, 16 R, 24/17 B, 30.5 R, 30.5 S, 30.5 P, 300; 40/603, 607, 611, 536, 537; 116/173; 404/10, 603, 617; 132/295

(56) References Cited

U.S. PATENT DOCUMENTS

| | | | |
|---|---|---|---|
| 2,355,705 A | * 8/1944 | Cohn | 24/16 R X |
| 2,608,691 A | 9/1952 | Berg | |
| 2,845,670 A | 8/1958 | Brown et al. | |
| 3,048,906 A | 8/1962 | Patterson | |
| 3,099,271 A | * 7/1963 | Dubelier | 132/273 |
| 3,522,635 A | * 8/1970 | Nilsson | 24/369 |
| 3,751,769 A | 8/1973 | Reiner | 24/73 ES |
| 4,158,250 A | 6/1979 | Ringwald | 24/16 R |
| 4,335,490 A | * 6/1982 | Teachout | 24/30.5 S X |
| 5,020,192 A | 6/1991 | Gerlach | 24/136 R |
| 5,024,551 A | 6/1991 | Hinterholzer | 404/10 |
| 5,058,863 A | 10/1991 | Maffet | 256/26 |
| 5,318,734 A | 6/1994 | Palmersten et al. | 264/46.5 |
| 5,345,656 A | 9/1994 | Merritt | 24/115 H |
| 5,697,128 A | 12/1997 | Peregrine | 24/115 G |
| 5,715,578 A | * 2/1998 | Knudson | 24/16 PB |
| 5,797,167 A | 8/1998 | Schwab | 24/16 R |
| 6,176,642 B1 | * 1/2001 | Hinterholzer | 404/10 |

FOREIGN PATENT DOCUMENTS

FR    1 450 821    12/1966

* cited by examiner

*Primary Examiner*—Robert J. Sandy
(74) *Attorney, Agent, or Firm*—Ronald P. Kananen, Esq.; Rader, Fishman & Grauer, PLLC

(57) ABSTRACT

A gate panel attachment assembly having a pair of poles and a panel. The panel includes a pair of sleeves for accepting the poles. Adjacent to each sleeve, lies a mounting surface including a grommet in each. The attachment assembly includes an elastic cord and plastic button. The ends of the cord are fixed in an inner portion of the button. Once the poles are fed through each sleeve, a looped end of the elastic cord is stretched around each sleeved pole and extended over top of the button. The elastic cord rests between the button and grommet under tension creating a self-retaining system.

20 Claims, 3 Drawing Sheets

GATE PANEL ATTACHMENT ASSEMBLY

BACKGROUND OF THE INVENTION

1. The present invention relates to an attachment assembly for securing a gate panel including a panel and a pair of poles. The attachment assembly includes an elastic cord and fastener button for retaining the panel on sleeved poles for use in, but not limited to, a ski racing gate assembly.

2. Description of the Related Art

A traditional gate panel assembly does not include a convenient and simple means of securing the panel or various object to a pole or pole type member. For example, the fastener member may be of a metal material thus causing injury to those who forcibly come into contact with the traditional assembly. Further such arrangements are difficult to manipulate thus eliminating ease of use, especially in cold weather.

If the fastener is a plastic material, it is usually complex with multiple parts and numerous fastening members. The attaching members of this type often use additional means to hold an end of the elastic member of the cord.

Another type includes a panel attached to posts, but the attachment is only an elastic cord or an elastic cord fixed to an anchor inside a fixed gate assembly.

There are also various binding devices, none of which include a simple and inexpensive button of the present design. For example, a resilient cord is manipulated around a pin, neither of which are attached as one unit. Another example, is an elastic cord that includes a loop and crimped end, but the crimped end is not in a convenient plastic type button nor is the loop which may be formed by a crimped end large enough to enclose a pole even when stretched. Such designs are usually complicate to attach and detach, causing the user to expend considerable time and energy adjusting and/or securing the panels and poles.

Thus, the conventional gate panel attachment assembly is simple, inexpensive, easy to use, and an overall self-retaining system.

SUMMARY OF THE INVENTION

An object of the present invention is to provide a quick and simple attachment system for a gate and panel assembly that, for example, a user can assemble in cold conditions using gloves.

Another object of the present invention is to provide the ability to retain the panel in place on the pole, thus avoiding slippage between the panel sleeve and pole in a normal resting position or under a normal impact force of a skier or the like.

An additional object of the present invention is in the event that a skier collides with the gate assembly, not only will the assembly remain attached, but potential injury to the skier will be minimized due to the use of plastics and elastic members.

Another object is to provide a gate panel assembly having the ability to adapt to a range of diameters for various poles.

Still another object is to provide a gate panel assembly which is easy to manufacture and less expensive than complicated plastic clips or hook and loop fastener sleeves and straps.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to a broad aspect of the present invention, a gate panel attachment assembly is provided comprising: a panel having a sleeve on each end of the panel for accepting a pole therein. Each sleeve includes a mounting surface with a grommet therein. The gate panel is secured using an attachment assembly having a button and elastic cord. The elastic cord has an end fixed at a lower portion of the button which has a smaller diameter for keeping the end of the cord from escaping the lower end, thus fixing the end of the cord. The cord is fixed by crimping the ends, as well known in the art. The crimped ends of the cord forms a loop, at an opposite end thereof, which is fed through the grommet and tensioned around the sleeved pole and locked behind a larger diameter head of the button, between an undersurface of the button and the grommet.

The apparatus is characterized by the retaining power of the button and elastic cord of the attachment assembly keeping each pole attached in the sleeves of the panel, thus forming the gate panel.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A first embodiment of the present invention will now be described in detail with reference to FIGS. 1 to 3 of the accompanying drawings.

Figure 1:
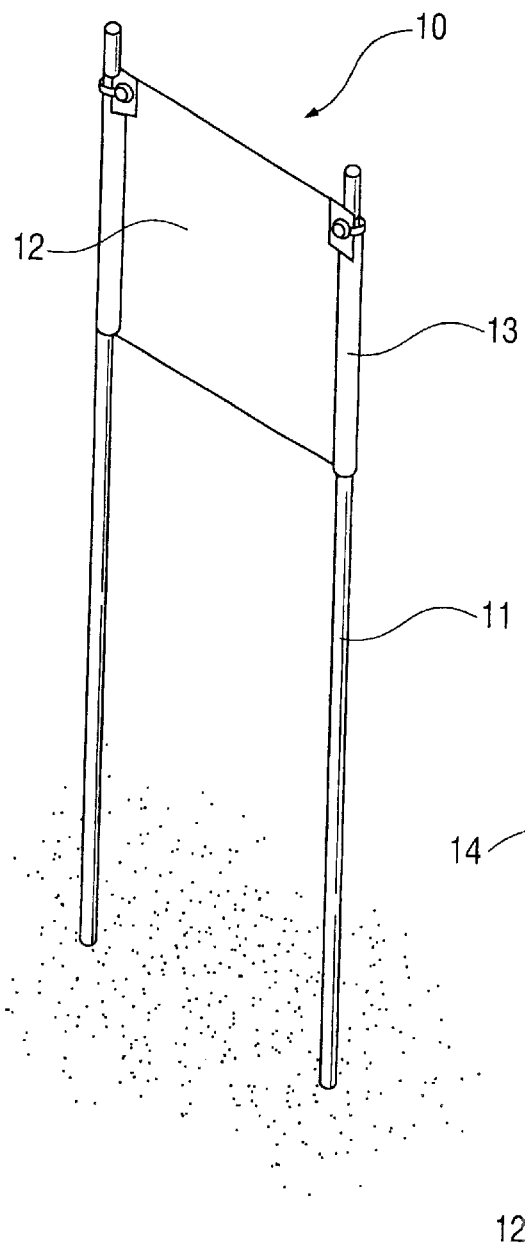
FIG. 1 is a perspective view showing a gate panel attachment assembly according to a preferred embodiment of the present invention.

FIG. 1 shows the gate panel attachment assembly 10 having a panel 12 with sleeves 13 and poles 11 inserted and retained in the sleeves 13 at one end and in he ground at the other end. The poles 11 are retained by the attachment assembly which includes a button 16 and elastic cord 17 (FIG. 2), to be explained in detail below. The panel 12 may be a particular color, have meaning to a contestant, or carry indicia such as advertising.

Figure 2:
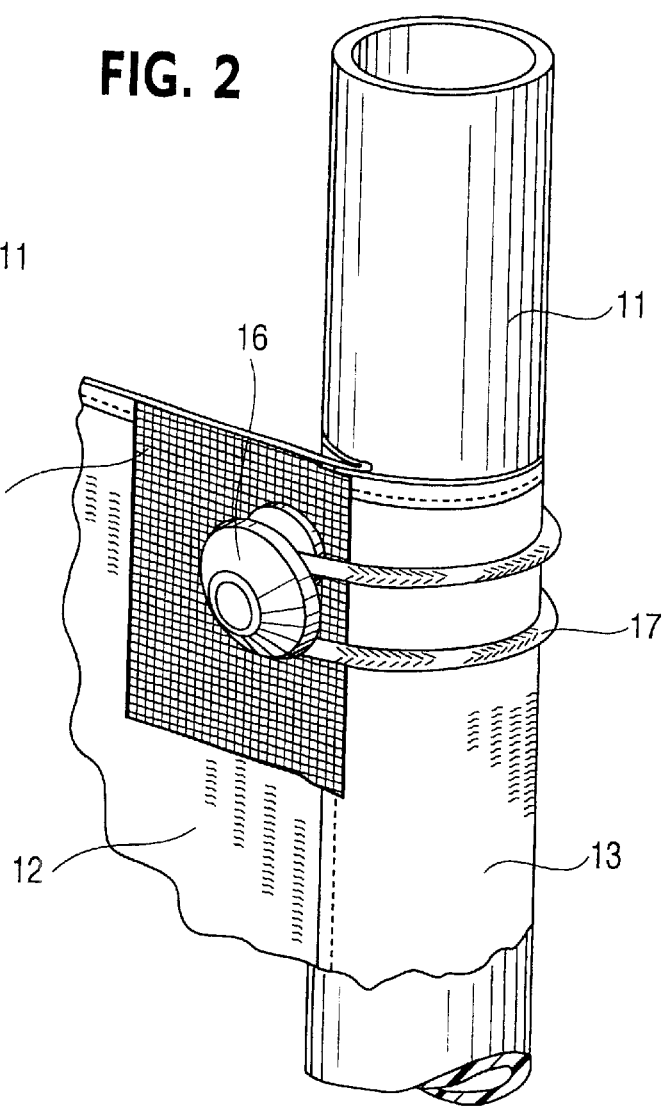
FIG. 2 is a view of the attachment assembly including the button and elastic cord retaining the panel sleeve on a pole according to the preferred embodiment of the present invention.

As shown in FIG. 2, the panel 12 includes a mounting surface 14 adjacent to each sleeve 13. The mounting surface 14 includes a grommet 15 therein, best seen in FIG. 3. The grommet 15 is positioned within the mounting portion at a side closer to the sleeve 13 of the panel 12. The mounting surface 14 also defines an end portion of the sleeve 13, ensuring that the poles 11 fit comfortably therein.

Figure 3:
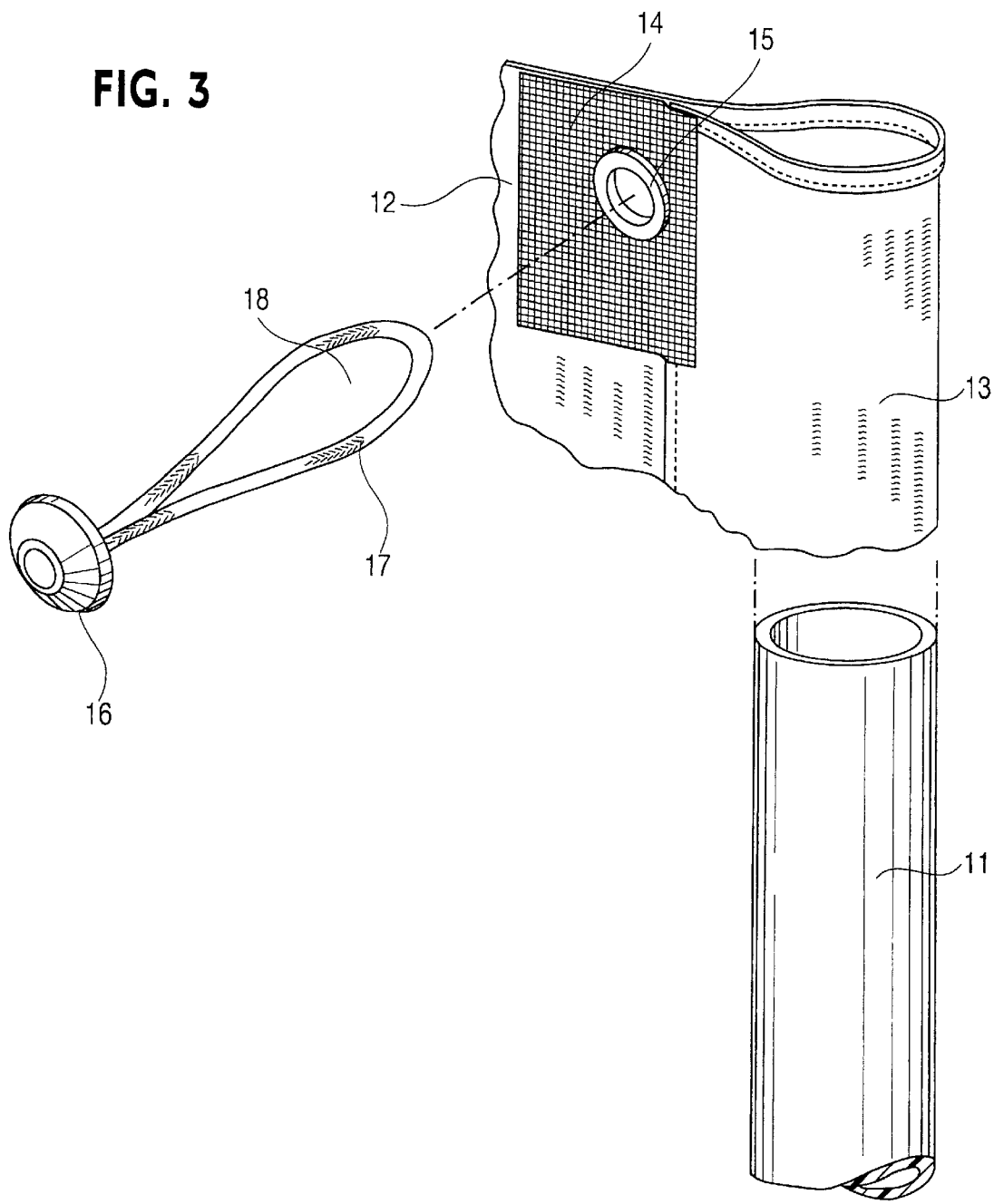
FIG. 3 is an exploded view showing the gate panel attachment assembly according to the preferred embodiment of the present invention.
Figure 4:
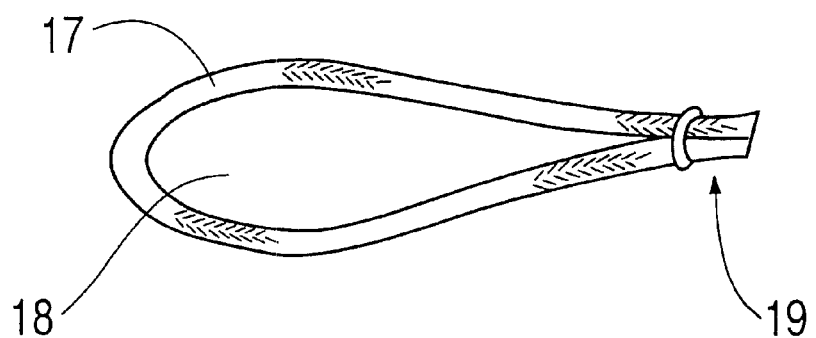
FIG. 4 shows a loop of a cord having ends crimped by a metal fastener.
Figure 5:
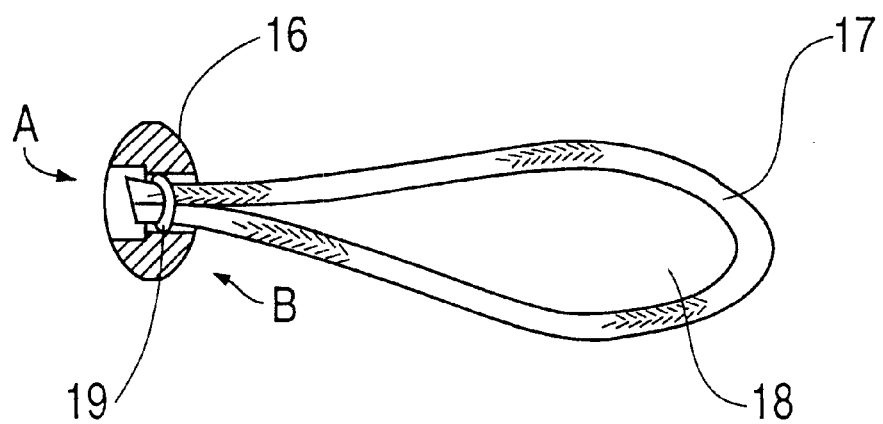
FIG. 5 shows a loop as in FIG. 4 having its crimped ends housed in an inner portion of the button.

FIGS. 2 and 3 show the button 16 and elastic cord 17. The elastic cord 17 has one end fixed a small diameter lower portion "B" of the button. The smaller diameter "B" (see FIGS. 5 and 6) retains the crimped ends of the cord in the button 16 thus forming a loop 18. The cord ends are conventionally crimped by a metal fastener 19 and housed in an inner portion of the button 16 (see FIG. 5). The button 16 covers the fastener member 19 which crimps the ends of the cord 17, thus the metal fastener 19 an crimped ends of the cord 17 are retained in a convenient plastic button 16. The crimped ends of the cords 17 can be seen at an opened recessed portion at a top of the button 16. The button 16 has a larger diameter "A" at a middle section of the button, the smaller diameter top and bottom portions "B" of the button are on either side of the middle portion of the button.

In operation, a pole 11 is inserted into each sleeve 13. The loop 18 is inserted into either side of the grommet 15 and stretched around the pole 11 at the surface covered by the sleeve 13 and over the larger diameter middle of the button 16. The elastic cord 17 will fall between the lower portion of the button, under the middle portion of the button 16, and the grommet 15 resting there under tension. Any amount of tugging force will not cause the elastic to pull away from the button 16 thus creating a self-retaining system. The length of the loop may be any length that allows for a tensioned attachment around the pole. The loop length must be relative to the circumference of each pole for a tight engagement therebetween.

The button may be made of plastic ensuring that if a skier collides with the assembly, the face, head, etc. of the skier will not be damaged as with a traditional metal fastener. The present design uses, for example, a metal fastener or similar material for crimping the elastic cord ends. The cord is made of any elastic type material as long as its length of its material allows for a tensioned attachment around the poles 11. The mounting surface may also be a plastic material or the like as shown in FIG. 2.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A gate panel attachment assembly attaching a panel to a spaced pair of poles, the panel includes a pair of sleeves on opposing ends of said panel, each sleeve respectively engaging one of said pair of poles, the gate panel attachment assembly comprising:
   a button;
   a cord having a fixed end housed in the button forming a loop in said cord; and
   a mounting surface adjacent to each of said pair of sleeves with a grommet included therein, wherein the loop is fed through the grommet until the button comes in contact with the grommet, so that while the poles are positioned in said pair of sleeves in the panel, the cord is stretched around each sleeved pole and over a top of the button.

2. The gate panel attachment assembly of claim 1, wherein the loop of the cord rests between a lower surface of said button and the grommet.

3. The gate panel attachment assembly of claim 1, further including a fastener.

4. The gate panel attachment assembly of claim 3, wherein said fixed end of said cord is positioned opposite said loop and is crimped by said fastener.

5. The gate panel attachment assembly of claim 4, wherein the button houses the fixed end of the cord and the fastener in an inner surface thereof.

6. The gate panel attachment assembly of claim 5, wherein said fastener is metal.

7. The gate panel attachment assembly of claim 1, wherein said cord is an elastic material which stretches around each sleeved pole creating a tension which retains the poles in the sleeves of the panel.

8. The gate panel attachment assembly of claim 1, wherein said button is plastic.

9. An attachment assembly for attaching a gate panel including a panel with sleeves and a pair of poles, the sleeves include a mounting surface including a grommet therein adjacent to the sleeves, the attachment assembly further comprising:
   a button;
   an elastic cord having a loop;
   a fastener, housed in said button, and crimping opposite ends of said elastic cord forming the loop of said cord;
   wherein the loop is sized to be fed through the grommet until the button comes in contact with the grommet, and so that while the poles are positioned in said pair of sleeved in the panel, the loop of the elastic cord is stretched around each sleeved pole and over a top of the button, the loop of the cord rests between a lower surface of said button and the grommet.

10. The attachment assembly of claim 9, wherein the button includes a larger diameter middle portion between the top of the button and the lower surface of the button, wherein the loop portion is stretched over the top of the button and around the larger diameter middle portion of the button where the loop is retained between the lower surface of the button and the grommet.

11. The attachment assembly of claim 9, wherein said fastener is metal.

12. The attachment assembly of claim 9, wherein said elastic cord stretches around each sleeved pole and button, creating a tension which retains the poles in the sleeves of the panel.

13. The attachment assembly of claim 9, wherein said button is plastic.

14. A gate panel attachment assembly attaching a panel to a pair of poles, the panel includes a pair of sleeves on opposing ends of said panel, each sleeve is for engagement with said pair of poles and includes a mounting surface with a grommet therein, adjacent to the sleeves, the attachment assembly further comprising
   a plastic button having a top, middle, and bottom;
   an elastic cord having a fixed end forming a loop; and
   wherein the loop is fed through the grommet until the bottom of the button comes in contact with the grommet, while he poles are positioned in said pair of sleeves in the panel, the elastic cord is stretched around each sleeved pole and over a top of the button, stretched over the middle of the button which has a large diameter, and rests between the bottom of the button and the grommet.

15. The gate panel attachment assembly of claim 14, further including a fastener.

16. The gate panel attachment assembly of claim 15, wherein said fixed end of said cord is positioned opposite said loop and is crimped by said fastener.

17. The gate panel attachment assembly of claim 16, wherein the button houses the fixed end of the cord and the fastener in an inner surface thereof.

18. The gate panel attachment assembly of claim 15, wherein said fastener is metal.

19. A method of assembling a gate panel attachment assembly providing a gate panel and a spaced pair of poles, comprising the steps of:

inserting each of said pair of spaced poles into respective sleeves of said panel, said sleeves on opposing ends of said panel; and feeding a loop end of an elastic member through a grommet, positioned adjacent to each sleeve and forming a sleeve circumference for accepting each of said pair of poles, until a button at an opposite end of said elastic member comes into contact with said grommet.

20. The method of claim 19, further comprising the step of extending said loop end around a sleeved portion of said pair of poles, over a top of said button, stretched over a middle of said button which has a larger diameter, to rest between a bottom of the button and the grommet.

\* \* \* \* \*

UNITED STATES PATENT AND TRADEMARK OFFICE
CERTIFICATE OF CORRECTION

PATENT NO.     : 6,389,659 B1
DATED          : May 21, 2002
INVENTOR(S)    : John F. Jacobs It is certified that error appears in the above-identified patent and that said Letters Patent is hereby corrected as shown below:

<u>Column 4,</u>
Line 24, replace "sleeved" with -- sleeved --.
Line 53, replace "he" with -- the --.
Line 56, replace "large" with -- larger --.

Signed and Sealed this

Twenty-first Day of January, 2003

JAMES E. ROGAN
*Director of the United States Patent and Trademark Office*